United States Patent [19]

Gigante et al.

[11] Patent Number: 5,647,697
[45] Date of Patent: Jul. 15, 1997

[54] METHOD AND DEVICE FOR FEEDING PACKETS OF CIGARETTES PNEUMATICALLY

[75] Inventors: Antonio Gigante, Bologna; Antonio Portaro, Milan, both of Italy

[73] Assignee: G.D S.p.A., Bologna, Italy

[21] Appl. No.: 507,191

[22] Filed: Jul. 26, 1995

[30] Foreign Application Priority Data

Jul. 27, 1994 [IT] Italy ................... BO94A0358

[51] Int. Cl.⁶ ......................................... B65G 51/02
[52] U.S. Cl. ....................... 406/83; 406/79; 406/82; 406/147; 406/153
[58] Field of Search .................. 406/79, 82, 83, 406/147, 153

[56] References Cited

U.S. PATENT DOCUMENTS 3,089,732  5/1963  Gamberini .
3,210,130  10/1965  Kelly .
4,940,368  7/1990  Marcu ............................... 406/79

FOREIGN PATENT DOCUMENTS 1200392  12/1959  France .
1404424  6/1988  U.S.S.R. ........................... 406/147
1209578  10/1970  United Kingdom ............... 406/79

Primary Examiner—Gary C. Hoge
Attorney, Agent, or Firm—Cushman Darby & Cushman IP Group of Pillsbury Madison & Sutro LLP

[57] ABSTRACT

Packets of cigarettes are conveyed singly and in succession to a first inlet of a propulsion chamber also having an outlet, connected to a duct, and at least one other inlet through which compressed air is directed into the enclosure; as one packet is carried forward by the force of inertia to the point of occupying the outlet, another packet takes its place at the inlet, the effect of which being to enclose the chamber completely and occasion a rise in pressure sufficient to generate a force by which the packet occupying the outlet is "fired" along the duct.

6 Claims, 2 Drawing Sheets

METHOD AND DEVICE FOR FEEDING PACKETS OF CIGARETTES PNEUMATICALLY

BACKGROUND of the INVENTION

The present invention relates to a method of feeding packets of cigarettes pneumatically. In particular, the invention relates to a pneumatic feed device for packets of cigarettes such as can be used to advantage in cigarette manufacturing and wrapping systems for the purpose of transferring packets singly and in succession from one machine of the system to another.

The prior art embraces the practice of transferring packets of cigarettes in succession from one point to another by means of overhead pneumatic conveyors extending above the machines of the system, which are connected to the single machine units by rising and descending ducts. Generally speaking, packets are advanced along the ducts in these conventional systems, and in particular along the rising ducts, employing a method whereby the selfsame packets are invested during the course of their progress with successive blasts of compressed air delivered by injectors distributed along the conveying path. When applied to packets of cigarettes, this type of method betrays certain drawbacks deriving mainly from the effect of the successive blasts of air on the packets, which tend to oscillate internally of the ducts and become jammed.

SUMMARY OF THE INVENTION

The object of the present invention is to provide a method of feeding packets pneumatically, such as will remain free of the drawbacks mentioned above.

The stated object is realized, according to the present invention, in a method that comprises the steps of feeding packets singly and in succession along a predetermined direction into a first inlet of a propulsion chamber also affording an outlet, aligned with the first inlet in the predetermined direction, and a second inlet disposed between the first inlet and the outlet, through which to supply a pressurized fluid, propelling the packets in succession across the chamber in such a way that each in turn is made to occupy the outlet, and restraining the packets in succession at the outlet by the application of a predetermined force. Pressurized fluid is supplied to the chamber from the source through the second inlet in such a way that with one packet occupying the outlet and a successive packet simultaneously occupying the first inlet, pressure will rise in the chamber to a level sufficient to overcome the restraining force.

The method of the present invention preferably is practice by using to a device for feeding packets of cigarettes p duct, comprising conveyor means by which packets are directed in succession along a predetermined direction, a source of pressurized pneumatic fluid, and a propulsion chamber exhibiting a first inlet open to the packets and associated with the runout end of the conveying means, an outlet transitable by the packets, aligned with the first inlet along the predetermined direction and connected to the duct, and a second inlet disposed between the first inlet and the outlet and connected to the source of fluid. The device also comprises deformable means of restraint positioned at the chamber outlet, by which each successive packet is intercepted and halted at the outlet with a predetermined force.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
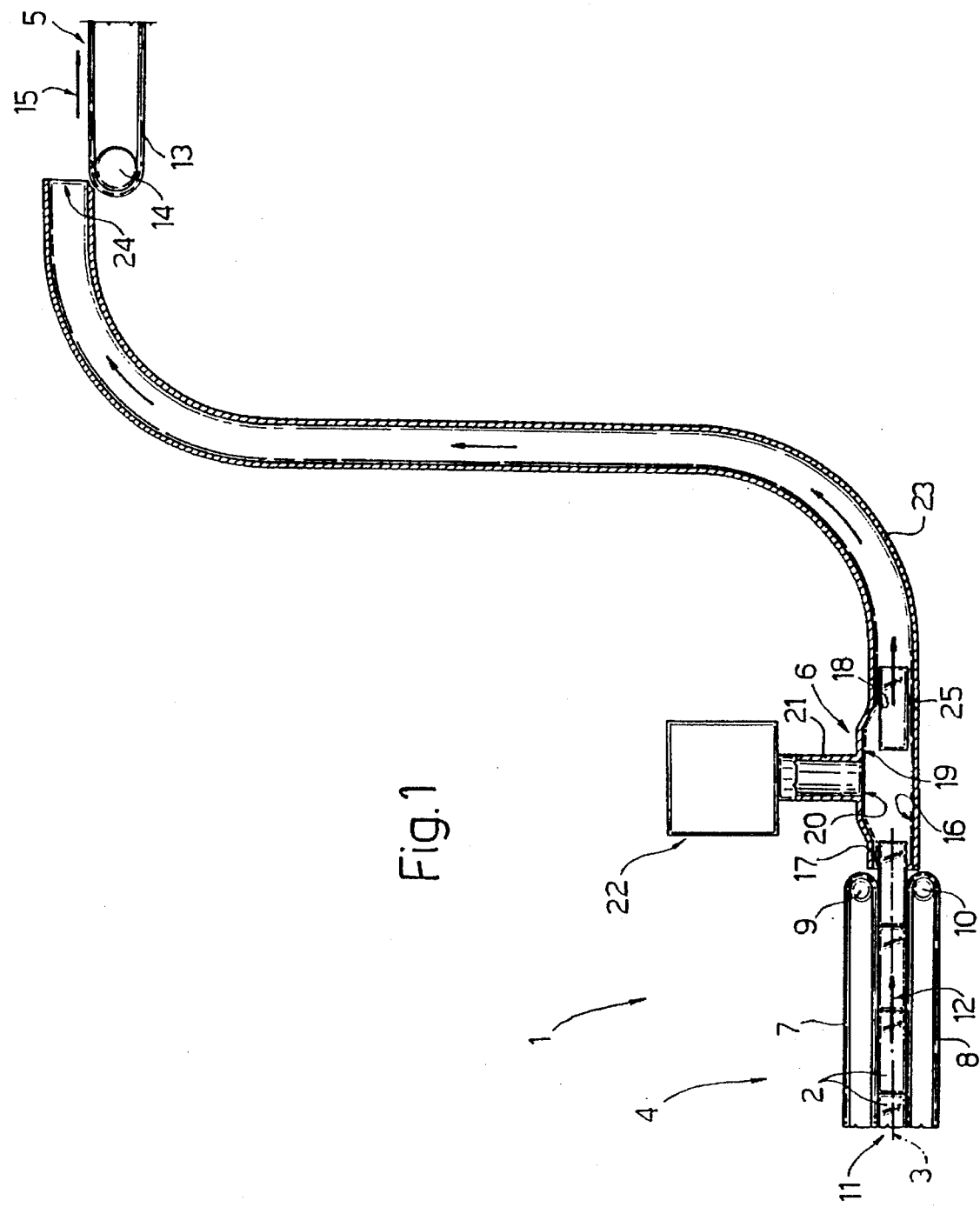
FIG. 1 shows a preferred embodiment of the device preferred for use in practicing the method according to the present invention, illustrated schematically in an axial section.
Figure 2A:
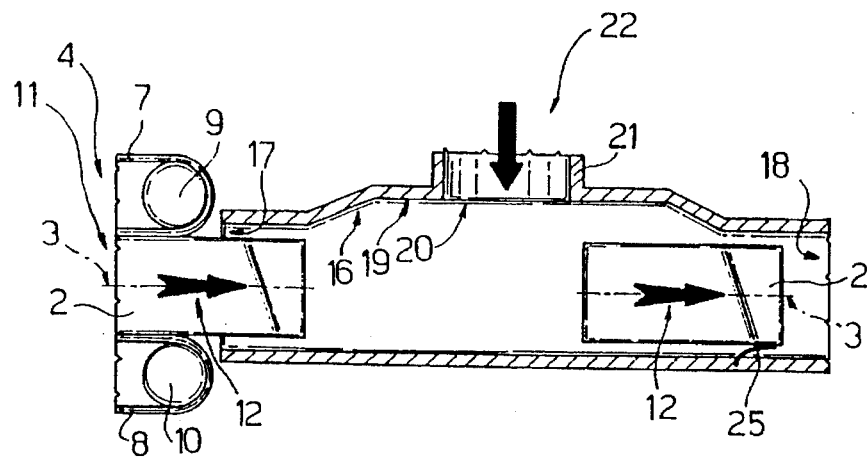
FIGS. 2 (a), 2 (b), and 2 (c) show a detail of FIG. 1, enlarged and viewed in three distinct operating positions of the device.
Figure 2B:
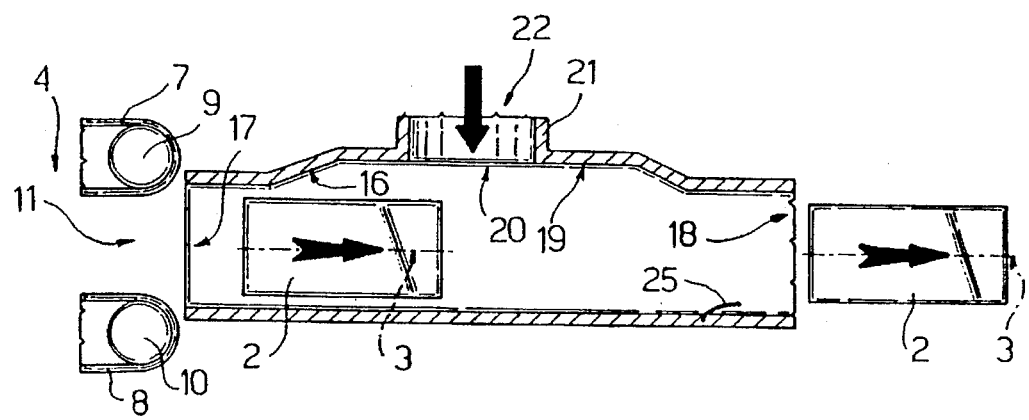
Figure 2C:
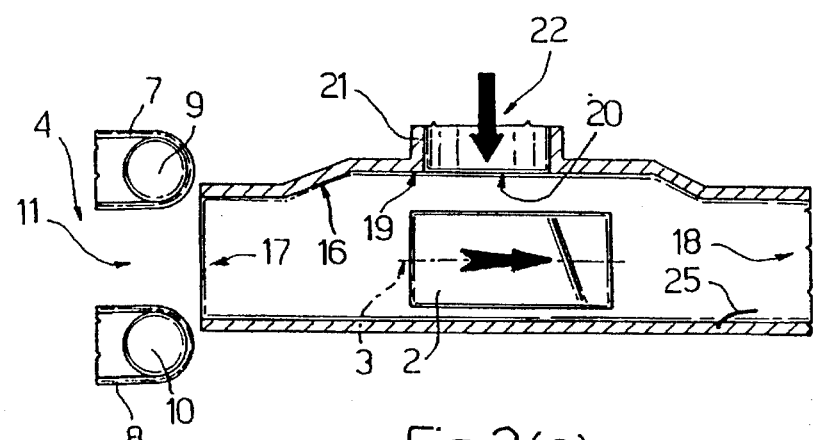

Referring to FIG. 1 of the drawings, 1 denotes a device, in its entirety, for conveying packets 2 of cigarettes exhibiting a substantially rectangular parallelepiped shape and with a readily discernible main longitudinal axis 3.

The conveyor device 1 comprises an incoming portion and outgoing portion consisting in respective belt conveyors 4 and 5, the latter disposed at a level higher than the former, and an intermediate portion consisting in a pneumatic conveyor 6.

The incoming conveyor 4 comprises two belts 7 and 8 looped around respective sets of pulleys 9 and 10 (certain of which only are illustrated), the one positioned above the other in such a manner as to create a feed channel 11 through which a succession of packets 2 can be transported in a substantially horizontal direction 12.

By contrast, the outgoing conveyor 5 consists in a single belt 13, looped around a corresponding set of pulleys 14 (one only indicated), along which the packets 2 are transported freely in a substantially horizontal direction 15 extending parallel with the direction 12 first mentioned.

The pneumatic conveyor 6 comprises a propulsion chamber 16, which affords an inlet 17 facing and adjoining the runout end of the incoming conveyor 4 and exhibiting a sectional area marginally greater than that of the feed channel 11, also an outlet 18 aligned axially with the inlet 17 along the initial feed direction 12 and exhibiting a sectional area substantially identical to that of the inlet, and an intermediate portion 19 extending between the inlet 17 and the outlet 18, of which the sectional area is greater than that of the inlet. This same intermediate portion 19 of the chamber 16 affords a further inlet 20 connected by way of a duct 21 with a source 22 of pressurized fluid, which in effect will be compressed air. Also forming part of the pneumatic conveyor 6 is a duct 23 communicating in fluid-tight association with the chamber 16 by way of the outlet 18, and exhibiting a substantially S shaped longitudinal profile; the cross sectional profile of the duct 23 remains essentially the same throughout and is substantially identical to that of the outlet 18. The S profile extends upward, so that the packets 2 are transferred singly and in succession from the entry end of the duct 23, which coincides with the outlet 18 of the chamber 16, to an exit end 24 disposed in alignment with the feed direction 15 on the higher level and facing the take-up end of the outgoing conveyor 5.

Numeral 25 denotes a flexible restraining element located at the outlet 18 and projecting into the propulsion chamber 1, in such a manner that the transitable area afforded by the outlet 18 is made smaller than the cross sectional area of a single packet 2, and the packet can pass through the outlet 18 only when the element 25 is deformed elastically by investing the packet 2 with an axial force of predetermined strength applied parallel to the feed direction 12. In operation, compressed air flows continuously from the source 22 through the relative duct 21, with the result that a relatively low pressure is established internally of the chamber 16 not least by virtue of the fact that the inlet 17 and the outlet 18 are completely open to the atmosphere, at least initially. When the incoming conveyor 4 is activated, the belts begin directing a continuous succession of packets 2 toward the inlet 17 at a predetermined velocity; the situation described above will remain unchanged until such time as the leading packet 2 has passed through the inlet 17, become separated from the conveyor 4, crossed the chamber 16 under the force of inertia and drawn to a halt in the outlet 18 on making contact with the restraining element 25. At this point, with the outlet 18 blocked, pressure begins to rise within the chamber 16 and increases sharply as the next packet 2 directed forward by the conveyor 4 enters and blocks the inlet 17.

The pressure building internally of the chamber 16 impinges in equal measure on the two packets which occupy the inlet 17 and outlet 18, albeit no effect is produced on the packet 2 still lodged between the belts of the conveyor 4 and driven forward by the succession of packets 2 behind; conversely, the packet 2 occupying the outlet 18 will be forced out of the chamber 16. In practice, the pressure of the air imprisoned internally of the chamber 16 rises gradually, but at an extremely swift rate, and on reaching a value such that the packet 2 is invested with an axial force sufficient to overcome the grip generated by the element 25, the packet 2 will be propelled forcibly through the outlet 18 beyond the restraining element 25, and carried rapidly along the duct 23 toward the exit end 24 by the wave of pressure propagated within the bore.

The fact that the intermediate portion 19 of the chamber presents an enlarged cross sectional area is instrumental in creating a momentary depression within the enclosure immediately after the packet 2 has been ejected from the outlet 18; the effect of the partial vacuum thus generated is to assist the successive packet 2, positioned at the inlet 17, in separating from the conveyor 4 and advancing across the chamber 16 to the outlet 18, at which point its engagement with the flexible restraining element 25 becomes the trigger for an automatic repetition of the cycle described above.

In another possible embodiment of the pneumatic conveyor 6 (not illustrated in the drawings), the intermediate portion 19 of the chamber 16, located between the first inlet 17 and the outlet 18, might be fashioned with two diametrically opposed second inlets 20. Accordingly, when air is supplied under pressure to the chamber 16, a packet moving across the intermediate portion 19 under the force of inertia will be supported as if on an air cushion, and prevented from rubbing against the bottom wall of the chamber 16.

In addition, the greater quantity of air entering the chamber 16 per unit of time will occasion a swifter rise in pressure within the intermediate portion, advantageously reducing the time required to produce the axial force needed for a packet 2 retained by the flexible element 25 to be propelled through the outlet 18 and into the duct 23.

What is claim is:

1. A method of feeding packets of cigarettes pneumatically along a duct, comprising the steps of:

feeding packets singly and in succession along a predetermined direction into a first inlet of a propulsion chamber that also affords an outlet, aligned with the first inlet in the predetermined direction, and a second inlet, disposed between the first inlet and the outlet, through which to supply a pressurized pneumatic fluid;

propelling the packets in succession across the chamber in such a way that each in turn is caused to occupy the outlet;

restraining the packets in succession at the outlet by the application of a predetermined force;

supplying the pressurized fluid to the chamber through the second inlet in such a way that with one packet occupying the outlet and a successive packet simultaneously occupying the first inlet, pressure will rise internally of the chamber to a level sufficient to overcome the restraining force.

2. A method as in claim 1, wherein the pressurized pneumatic fluid is supplied continuously to the interior of the propulsion chamber.

3. A method as in claim 1 , wherein the predetermined force is a frictional force.

4. A method as in claim 3, wherein the predetermined force is applied by way of a flexible restraining element positioned at the outlet.

5. A method as in claims 1, wherein the packets are fed to the first inlet in continuous succession in such a way that the first inlet is blocked substantially in permanent fashion.

6. A method as in claim 5, wherein the packets are fed to the first inlet at a predetermined velocity sufficient for each packet to advance across the propulsion chamber under the force of inertia and reach the outlet.

* * * * *